US009716630B2

(12) United States Patent
Silvers

(10) Patent No.: US 9,716,630 B2
(45) Date of Patent: Jul. 25, 2017

(54) DATA PACKET TRANSPORT AND DELIVERY SYSTEM AND METHOD

(71) Applicant: SILVERSMITH, INC., Gaylord, MI (US)

(72) Inventor: David Silvers, Mancelona, MI (US)

(73) Assignee: Silversmith, Inc., Gaylord, MI (US)

( * ) Notice: Subject to any disclaimer, the term of this patent is extended or adjusted under 35 U.S.C. 154(b) by 181 days.

(21) Appl. No.: 14/428,085

(22) PCT Filed: Sep. 13, 2013

(86) PCT No.: PCT/US2013/059586
§ 371 (c)(1),
(2) Date: Mar. 13, 2015

(87) PCT Pub. No.: WO2014/043430
PCT Pub. Date: Mar. 20, 2014

(65) Prior Publication Data
US 2015/0229530 A1    Aug. 13, 2015

Related U.S. Application Data

(60) Provisional application No. 61/700,942, filed on Sep. 14, 2012.

(51) Int. Cl.
*H04L 12/28* (2006.01)
*H04L 12/24* (2006.01)
(Continued)

(52) U.S. Cl.
CPC ............ *H04L 41/12* (2013.01); *H04L 43/062* (2013.01); *H04L 45/00* (2013.01); *H04L 67/18* (2013.01);
(Continued)

(58) Field of Classification Search
None
See application file for complete search history.

(56) References Cited

U.S. PATENT DOCUMENTS

2003/0115101 A1    6/2003    Kim
2004/0231851 A1*   11/2004   Silvers .................... E21B 47/00
                                                              166/350
(Continued)

FOREIGN PATENT DOCUMENTS

WO    2009067251 A1    5/2009

OTHER PUBLICATIONS

Yun Koo Hwang, International Search Report, Jan. 2, 2014, 4 pages, Korean Intellectual Property Office, Republic of Korea.
(Continued)

*Primary Examiner* — Phirin Sam
(74) *Attorney, Agent, or Firm* — McGarry Bair PC

(57) ABSTRACT

A customer's server datagram request and/or customer field unit's datagram is wrapped with a header and footer that contains a defined hopping path with direction control. An IP Host stores predefined hopping paths to all of the customer's field units, and looks at the address of the customer's request packet to determine the correct hopping path. A communication device receives the customer's field unit's datagrams and adds a defined hopping path to send the datagram to the IP Host which removes the hopping path and sends the datagram to the customer server.

32 Claims, 4 Drawing Sheets

(51) Int. Cl.
    *H04L 12/701*    (2013.01)
    *H04L 12/26*     (2006.01)
    *H04L 29/08*     (2006.01)
    *H04L 29/06*     (2006.01)
    *H04W 40/22*     (2009.01)
    *H04Q 9/00*      (2006.01)

(52) U.S. Cl.
    CPC ............... *H04L 69/22* (2013.01); *H04Q 9/00* (2013.01); *H04W 40/22* (2013.01); *H04Q 2209/40* (2013.01); *Y02B 60/50* (2013.01)

(56) References Cited

U.S. PATENT DOCUMENTS

| | | | |
|---|---|---|---|
| 2006/0018317 A1* | 1/2006 | Jimmei | H04L 29/12292 370/389 |
| 2006/0197678 A1 | 9/2006 | Silvers | |
| 2008/0048883 A1* | 2/2008 | Boaz | G01D 4/004 340/870.02 |
| 2008/0310433 A1* | 12/2008 | Retana | H04L 45/02 370/401 |
| 2009/0073876 A1 | 3/2009 | Kimmich et al. | |
| 2009/0240813 A1 | 9/2009 | Chun | |
| 2011/0252453 A1 | 10/2011 | Binder | |

OTHER PUBLICATIONS

Jose Perez Perez, Supplementary European Search Report, Apr. 13, 2016, 7 pages, The Hague.

\* cited by examiner

DATA PACKET TRANSPORT AND DELIVERY SYSTEM AND METHOD

CROSS-REFERENCE TO RELATED APPLICATIONS

This application is a National Phase application of International Application No. PCT/US2013/059586, file Sep. 13, 2013, which claims the benefit of U.S. Provisional Patent Application Ser. No. 61/700,942, filed Sep. 14, 2012, which is incorporated herein by reference in its entirety.

BACKGROUND OF THE INVENTION

Field of the Invention

This invention relates to a data packet transport and delivery system. In one of its aspects, the invention relates to a method and system for transporting datapackets or datagrams between a customer server and a first remote field unit that lies within a remote geographic region with multiple geographically proximate, field units. In another of its aspects, the invention relates to remote monitoring and data collection. In another of its aspects, the invention relates to a system and method of gathering data from remote sources on a reiterative basis. In another of its aspects, the invention relates to a radio frequency communications system that communicates by transferring data packets along a predetermined route. In another of its aspects, the invention relates to monitoring and communication systems, such as for monitoring and reporting various parameters associated with remote data generating facilities. In another of its aspects, the invention relates to a wireless radio frequency communication system for transporting commands and data packets between multiple geographically proximate, generating field units in a geographic region and a remote customer server. In yet another of its aspects, the invention relates to a method for wireless communication between remotely spaced stations over predetermined paths. The invention further relates to an Internet protocol server, configured to receive datagrams for communicating with geographically dispersed field stations and to generate one or more communications data packets based, at least in part, on the received datagrams. Further, the invention relates to sensor based monitoring of defined technical information to generate data that is communicated from a remote location at least in part by a radio frequency communications system along a defined path to a customer server.

Description of the Related Art

Collection of data in a central location from remote sources is a common practice. The collection methods have evolved from manual collection and written reports to electronic reports gathered manually or electronically. Collection of data electronically in urban areas where wireless Internet access is abundant is common but is more difficult and expensive in remote areas where Internet access is unavailable or otherwise expensive to use.

A number of systems for electronic collection of data have been devised. In addition, there have also been various disclosures in the area of multi-hop node to node communications system and methods. For example, U.S. Pat. No. 7,242,317 to Silvers discloses well data and production control commands transmitted from a customer server to gas and well monitors at remote locations with signals that hop from well monitor to well monitor through a radio frequency (RF) network.

U.S. Pat. No. 6,842,430 to Melnick discloses packet-hopping wireless network in which data is communicated by transferring data packets from node-to-node over a common RF channel. Each of the individual nodes is preferably programmed to perform the step of comparing its own logical address to a routing logical address contained in each packet which it receives, and to either discard, re-transmit, or process the packet based upon the results of the comparison. The routing logical address contained in a received packet contains the full routing information required to route the packet from a sending node to a destination node along a communication path prescribed by the routing logical address.

Additionally, U.S. Patent Application No. 2007/0080150 discloses a network of welding equipment, where a wireless data signal is transmitted from a first node associated with a first welding type device and received at a second node associated with either a second welding-type device or a monitoring apparatus. The second node determines an intended recipient identifier from the wireless data signal. When the intended recipient identifier matches the identifier for the second node, the wireless data signal is processed. If the intended recipient identifier does not match the identifier for the second node, the wireless data signal is relayed.

In all of these hopping systems, the customer server is programmed with a data base with an address for each monitor. This system requires a software package that is written in the code for the customer protocol and requires extensive programming of the customer server. So long as each customer has the same protocol, the same basic software can be used. However, different industries have different protocols and new software must be written for each of the several protocols. In the event of any problems in the system, they require a technician to visit the customer facility to solve any software problems.

Further, these systems require some expert technical assistance to set up the systems in the field. Thus, the vendor must have a trained field staff to install and set up these hopping systems.

All of the references discussed in this section are incorporated herein by reference in their entirety.

SUMMARY OF THE INVENTION

According to the invention, a method for transporting datapackets or datagrams between a customer server and a first remote data-collecting or recording field unit that lies within a remote geographic region with multiple geographically proximate, communication units comprises: sending from the customer server, through a network, a request datagram for specified data from the first remote, data collecting or recording field unit to an IP Host; adding to the request datagram, at the IP Host, a first defined hopping path that includes the first geographically remote data collecting or recording field unit and at least one geographically proximate, communication units to generate a data request packet; sending the data request packet to the first geographically remote data collecting field unit along the first defined hopping path to the first remote, data field unit; and delivering the datagram as received by the IP Host from the customer server to the first geographically remote data field unit.

In one embodiment, a remote field unit can send a response datagram back to the customer server by transmitting the response datagram along a second hopping path that includes the IP Host and at least one of the multiple geographically proximate communication units. Further, the IP Host can transmit the response datagram to the customer server through a network.

In one embodiment, one or more communication units are associated with a data collecting or recording field unit.

In one embodiment, the IP Host is geographically remote from the customer. In addition, the IP Host can be geographically proximate to one or more of the geographically-spaced data-collecting field units. In one embodiment, the request datagram can include the identification of the first geographically remote data collecting field unit, and the IP Host may read the identification of the first geographically remote data collecting field unit in the request datagram as part of the act of adding the first defined hopping path to the request datagram.

In addition, the IP Host may have a table of defined hopping paths for each of the multiple geographically proximate, data-collecting field units and the first defined hopping path for the first geographically remote data collecting field unit can be selected from the table of defined hopping paths as part of the act of adding the first defined hopping path to the request datagram. In addition, the IP Host can add a header and footer with the first defined hopping path to the request datagram. Further, prior to delivery to a customer monitor, the first defined hopping path can be stripped from the transported datapackets or datagrams.

In another embodiment, the first and second hopping paths can include the first geographically remote data collecting field unit and at least one other geographically proximate, data-collecting field units.

In another embodiment, the second defined hopping path for the data response packet can be the last known good path between the first geographically remote data collecting field unit and the IP Host. In some cases, the last known good path is the last hopping path used to deliver the request packet in the reverse direction, and can be the first hopping path in the reverse direction.

The network through which the datapackets or datagrams between a customer server and a remote field unit are transported is any suitable electronic network between the customer server and the IP Host. Typically, the customer server and the IP Host will be geographically remote from each other, for example, at least outside the reach of RF communication, and, more likely, hundreds or thousands of miles from each other. The preferred network is the Internet, although any other suitable network communication is within the scope of the invention.

In another embodiment, the network through which the datapackets or datagrams between a customer server and a remote field unit are transported is any suitable network between the IP Host and the remote field unit. The IP Host and the remote field units are geographically proximate to at least one of the other remote field units, for example within the reach of wireless RF communication, and can vary over a wide range but typically will be in the range of 1 to 10 miles. Typically, the customer server and the remote field units will be geographically remote from each other, for example, at least outside the reach of wireless RF communication. In a preferred embodiment of the invention, 900 MHz frequency radio waves are used for transporting data along the hopping paths to an Internet provider station. For a 900 MHz frequency RF network, the remote field units are typically spaced less than 5 miles apart. Thus, in a preferred embodiment of the invention, a monitor hopping act includes wireless transmission of the gathered data between the geographically spaced remote field units via communications modules through an RF network.

In another embodiment, specified data from a customer monitor at the remote field unit can be gathered and sent to a communication unit at which the second or last known good hopping path is added.

In another embodiment, the customer server can send through the network a request datagram for collecting specified data from multiple geographically remote data collecting field units.

Further, according to the invention, a system for transporting datapackets or datagrams between a customer server and a first geographically remote, data-collecting field unit that lies within a remote geographic region with multiple geographically proximate, communication units comprises:

an IP host geographically remote from the customer server, communicatively coupled to the customer server and that is configured to:
  receive from the customer server through a network a request datagram for specified data from the first geographically remote, data collecting, field unit;
  to add to the request datagram a first defined hopping path that includes the first geographically remote data collecting field unit and at least one of the multiple geographically proximate, communication units to generate a data request packet; and
  to send the data request packet to the first geographically remote data collecting field unit along the first defined hopping path.

In one embodiment, the system can be configured such that a first geographically remote data collecting field unit delivers datagrams received by the IP Host from the customer server to a customer monitor. In addition, to generate a response packet, the first geographically remote data collecting field unit can be configured to receive a datagram and to add a second defined hopping path that includes the IP Host and at least one of the multiple geographically proximate communication units. Then, the data collecting field unit can transmit the response datagram with the collected data to the IP Host along the second defined hopping path.

In one embodiment, one or more of the geographically proximate, communication units is/are operably connected to a geographically remote, data-collecting field unit.

In another embodiment, the geographically-spaced data-collecting field units include a customer monitor for collecting data at a particular location and a communication unit that is configured to receive and send wireless signals.

In another embodiment, the IP Host can be geographically proximate to one or more of the geographically-spaced data-collecting field units.

The IP Host can be programmed to read an identification of the first geographically remote data collecting field unit in the request datagram. Further, the IP Host can be configured with a table of defined hopping paths for each of the multiple geographically proximate, data-collecting field units and the IP Host can be configured to select the first defined hopping path for the first geographically remote data collecting field unit from the table of defined hopping paths. In addition, the IP Host can be configured to add a header and footer with the first defined hopping path to the request datagram when generating the data request packet.

Further, the first geographically remote data collecting field unit can be programmed to select the last known good path between the first geographically remote data collecting field unit and the IP Host as the second defined hopping path for the data response packet.

In another embodiment, the network through which the datapackets or datagrams between a customer server and a remote field unit are transported is any suitable electronic network between the customer server and the IP Host. Typically, the network through which the request datagram and the response datagram is sent is the Internet. Typically, the customer server and the IP Host are at least outside the reach of RF communication.

The multiple geographically proximate, data-collecting field units are generally within the range of 1 to 10 miles. In some applications, the geographic spacing of the multiple geographically proximate, data-collecting field units is less than 5 miles apart. In a preferred embodiment, each of the multiple geographically proximate, data-collecting field units is within RF range of at least one other of the multiple geographically proximate, data-collecting field units. In addition, the IP Host may be geographically within wireless communication proximity to one or more of the multiple geographically proximate, data-collecting field units. Further, the remote geographic region with multiple geographically proximate, data-collecting field units can be outside of wireless communication proximity from the customer server.

Further, the IP Host and each of the multiple geographically proximate, communication or data-collecting field units can be configured to transmit the data request packet and data response packet through an RF network. In a preferred embodiment, the RF network is 900 MHz frequency radio waves.

The invention is not limited to data collection that results from a request from a customer server. The invention also relates to data collection from field units that are programmed to generate data on a regular basis or responsive to an occurrence of an event at a monitoring station. In addition, the invention is not limited to communication units that are associated with field monitors. The hopping path may include one or more communication units that are not associated or necessarily linked to any particular field monitor.

Thus, according to another embodiment of the invention, a method for transporting datapackets or datagrams between a first remote data-collecting or recording field unit, which lies within a remote geographic region with multiple geographically proximate, communication units, and a customer server comprises: generating a data packet from current data from the first remote data-collecting or recording field unit, adding to the data packet a defined hopping path that includes at least one geographically proximate communication unit and an IP Host, sending the data packet from the first remote data-collecting or recording field unit to the IP Host, removing the hopping path from the data packet, and sending the data packet to the customer server through a network The generation of the data packet may be in response from a customer server or, alternatively, from an event at the monitor or from routine collection of data that is periodically sent to the customer server without a request from the customer server.

According to another embodiment of the invention, a system for transporting datapackets or datagrams to a customer server from at least one geographically remote, data-collecting customer monitor that lies within a geographic region remote from the customer server comprises:

multiple geographically proximate, communication units and an IP Host within the remote area, at least one of the communication units positioned geographically proximate to the at least one geographically remote, data collecting customer monitor, the at least one communication unit is configured to receive current data from the at least one geographically remote, data collecting customer monitor and to generate a data packet along with a defined hopping path that includes at least one other geographically proximate communication unit and the IP Host;

the at least one communication unit is further configured to send the data packet along the hopping path to the IP Host;

the IP Host is configured to remove the hopping path from the data packet and to send the data packet to the customer server through a network.

BRIEF DESCRIPTION OF THE DRAWINGS

The invention will now be described with reference to the accompanying drawings in which.

DESCRIPTION OF EMBODIMENTS OF THE INVENTION

Figure 1:
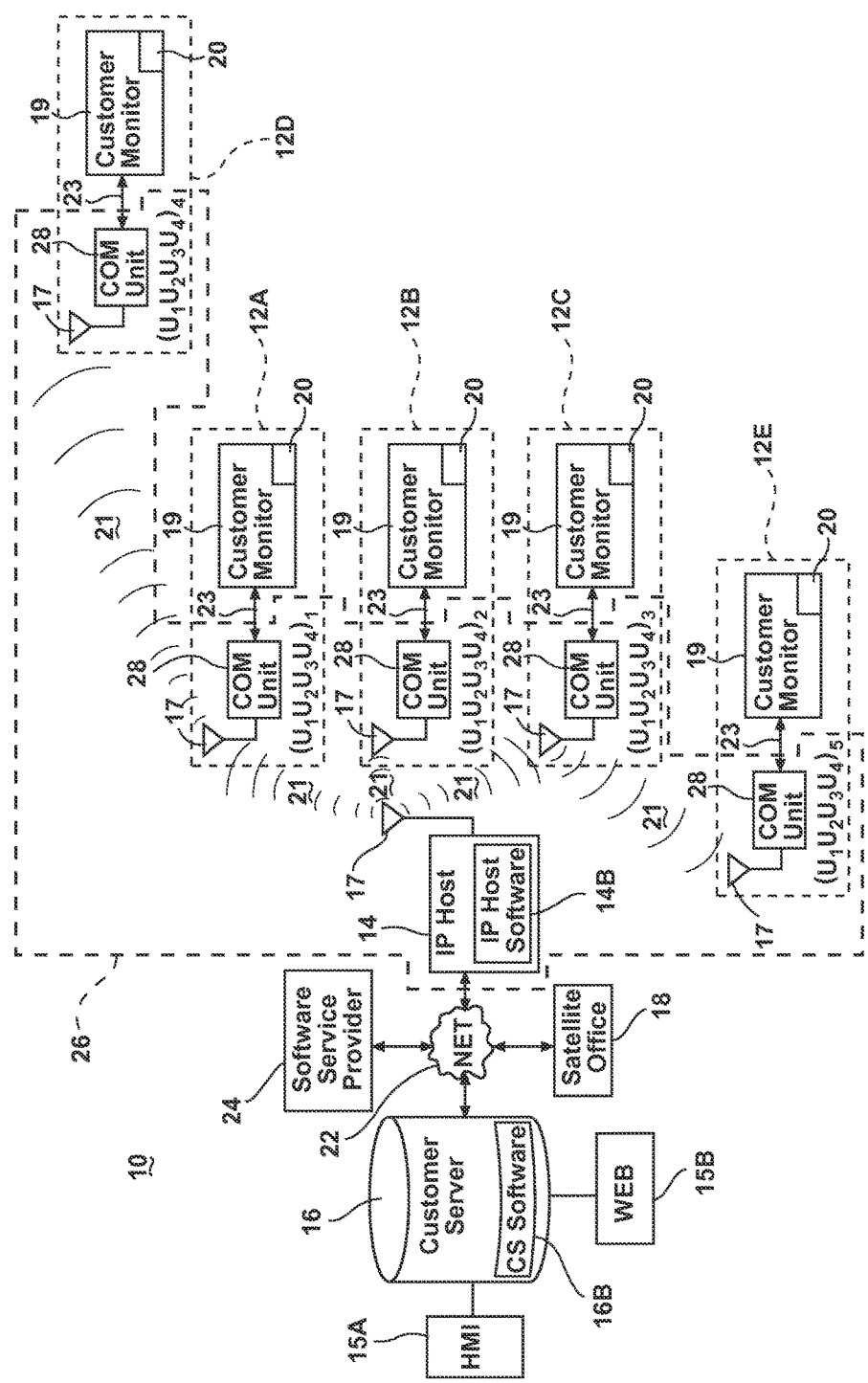
FIG. 1 is a schematic view of an example of a remote monitoring system according to embodiments of the invention.

Referring to the drawings, FIG. 1 depicts an example of a remote monitoring and data collection system 10 comprising: a customer location that includes a central data store or customer server 16 with a human machine interface (HMI) 15A, optionally, one or more customer satellite offices 18, multiple customer data collecting monitors 19 and a system 26 for transporting datapackets or datagrams according to the invention between the customer data collecting monitors 19 and the customer server 16, or customer satellite office 18, for collecting customer operating data from the customer data collecting monitors 19 and transmitting the collected customer operating data to the customer server 16 and/or the customer satellite office 18. The data transport system 26 typically operates upon requests for specified data sent from the customer server 16 (or customer satellite office 18) to communicate the data request to one or more of the customer data collecting monitors 19, which gather the requested data, and to transmit the requested data to the customer server 16 (or customer satellite office 18).

The customer location (and customer satellite office) is typically geographically remote from the customer data collecting monitors 19. For example, a company may have a data monitoring system located anywhere in the world and have scattered operating fields, for example, oil and gas wells, or power substations, located throughout other parts of the country of world. In many cases, a collection of customer data collecting monitors 19 will be geographically proximate to one another, for example, within 10 miles and/or within RF network proximity between one or more of each of the customer data collecting monitors 19. The data transport system 26 will be within geographic proximity to the customer data collecting monitors 19 and be able to communicate wireless between the customer data collecting monitors 19.

The data transport system 26 comprises an Internet Protocol (IP) Host 14 and multiple communication units 28, each of which is communicatively connected to a respective customer data collecting monitor 19. In some cases, a communication unit 28 can be connected to multiple customer monitors 19 through a wireless or hard wired connection. The combination of a data collecting system communication unit 28 and a customer data-collecting monitor 19 forms a geographically remote data collecting field unit field unit which are depicted in FIG. 1 as units 12A, 12B, 12C, 12D, and 12E. A software service provider 24 can be remotely connected to the IP Host 14 through the Internet for purposes of programming the IP Host software 14B during or subsequent to installation of the monitoring communication system 10.

The communications unit 28 of each of the data collecting field units 12A, 12B, 12C, 12D, and 12E is communicatively coupled via a communications link 23 to a customer monitor 19 that is configured to collect data related to a customer operation at a geographically spaced location. The communications unit 28 may be located at the monitoring site or on any element of, individual components of monitored facilities or equipment, such as power substations or gas/oil wells. In general, the field units 12A, 12B, 12C, 12D, and 12E have the ability to send radio frequency (RF) signals to one or more of other field units 12A, 12B, 12C, 12D, and 12E via a transceiver 17 communicatively coupled and/or controlled by each communications unit 28. The communications unit 28 may include, in one embodiment, one or more suitable electronic components, such as processor(s), memory, baseband integrated circuits, electronic filters, and/or other electronics. In one embodiment, the electronic components may enable the communications unit 28 to at least receive communicative signals 21 via the transceiver 17, process the communication signals 21, provide information based upon the communication signals 21 to the customer monitor 19, and/or generate further communicative signals 21 to communicate one or more other field units 12A, 12B, 12C, 12D, and 12E and/or the IP Host 14. Therefore, each of the field units 12A, 12B, 12C, 12D, and 12E, and in particular, each of the communications units 28, may be configured to communicate with other field units 12A, 12B, 12C, 12D, and 12E and/or communications units 28 associated therewith.

In certain embodiments, the field units 12A, 12B, 12C, 12D, and 12E may be geographically located in a manner where only a subset of the field units are proximal enough to the IP Host 14 to communicate directly with the IP Host 14 via communicative signals 21. Therefore, certain of the field units 12A, 12B, 12C, 12D, and 12E may be spatially far enough from the IP Host 14 so that direct communications between those field units 12A, 12B, 12C, 12D, and 12E and the IP Host 14 is not possible. In the example illustration of FIG. 1, field units 12A, 12B, and 12C may be at a location where those field units 12A, 12B, and 12C may communicate directly with the IP Host 14. Field units 12D and 12E may not be at a location where they can communicate directly with the IP Host 14. These field units 12D and 12E may, however, be in a location where they can communicate with one or more other field units, 12A and 12C, respectively. It will be appreciated that the configuration depicted in FIG. 1 is an example and that the embodiments of this disclosure may include any number of field units that may communicate with one or more IP Hosts, as well as, any number of field units that may not be proximal enough to the IP Host 14 to engage in direct communications with the IP Host 14. Each field unit 12A, 12B, 12C, 12D, and 12E can have a unique unit identification (ID) number, for example, a four digit number $U_1U_2U_3U_4$.

The customer monitor 19 may be configured to communicate data and/or information back and forth via the communications link 23 to the communications unit 28. Accordingly, data and/or information provided by a particular customer monitor 19 may be communicated from that customer monitor 19 to the communications unit 28 of the corresponding field unit 12A, 12B, 12C, 12D, and 12E and then on to other associated communications units 28 of field units 12A, 12B, 12C, 12D, and 12E or the IP Host 14 via RF communications links 21 from a communications transceiver 17. The customer monitors 19 may have one or more sensors 20 configured to collect sensor data, such as from the distributed monitored elements, and can communicate this data to the communications units 28 via the communications link 23. The distributed monitored elements may be any suitable elements, such as oil wells, gas tanks, traffic monitors, electrical power distribution equipment, or the like. The one or more sensors 20 may be any suitable sensor, including but not limited to, voltage sensors, current sensors, image sensors, audio sensors, flow sensors, volume sensors, pressure sensors, temperature sensors, vibration sensors, motion sensors, magnetic field sensors, humidity sensors, access sensors, contact sensors, or the like. The communications units 28 may be configured to receive the sensor data collected by the one or more sensors 20, from the customer monitor 19 and generate one or more data packets incorporating the sensor data, or portions thereof. The communications unit 28 may be further configured to transmit the data packet incorporating sensor data, or portions thereof, or other data to communications units 28 of other field units 12A, 12B, 12C, 12D, and 12E and/or the IP Host 14. The communications unit 28 may further be configured to receive data packets that include sensor data or other data from other field units 12A, 12B, 12C, 12D, and 12E.

In operation, data collected by the sensors 20 of the customer monitor 19 may be sent to the communications unit 28 and temporarily stored thereon. In other words, data collected on the customer monitors 19 with their corresponding sensors 20 may be transmitted to the corresponding communications unit 28 via the corresponding communications link 23 in real time or near real time and stored in registers or memory associated with the communications unit 28. Further, the data may be received by the communications unit 28 on a repeated basis from the corresponding customer monitor 19 and stored in registers and memory thereon. In one embodiment, the data may further be removed, such as from memory and/or registers, from the communications unit 28 as it is communicated to other field units 12A, 12B, 12C, 12D, and 12E or the IP Host 14. In other embodiments of the invention the data collected by the sensors 20 of a customer monitor 19 may be stored temporarily in registers or memory thereon before transferring to the corresponding communications unit 28 via communications link 23. In one embodiment, data may be temporarily stored to add hopping path information to the header and footer section of a response datagram.

In certain embodiments, the field units 12A, 12B, 12C, 12D, and 12E may communicate amongst themselves to communicate collected data back to the IP Host 14. As such, data may be communicated to the IP Host 14 via other field units 12A, 12B, 12C, 12D, and 12E in a manner where the data hops from one field unit 12A, 12B, 12C, 12D, and 12E to another field unit 12A, 12B, 12C, 12D, and 12E, until the data is delivered to the IP Host 14.

Within the field, the field units 12A, 12B, 12C, 12D, and 12E may be in close proximity of each other or they can be several miles apart. Groups of field units 12A, 12B, 12C, 12D, and 12E in a field are generally associated with one IP Host 14, but multiple IP Hosts 14 can be employed depending on the size of the field. Together, the units 12A, 12B, 12C, 12D, and 12E and their corresponding IP Host 14 comprise a wireless radio frequency (RF) network and communicate using a 900 MHz, a 2.4 GHz, an Industrial, Scientific, or Medical (ISM), any no-license, or any other suitable frequency band. Radio wave communication is well known and need not be described further. The IP Host 14 may have conventional radio transceiver 17 for receiving radio signals from the field units 12A, 12B, 12C, 12D, and 12E and transmitting radio signals to the field units 12A, 12B, 12C, 12D, and 12E. In addition, the IP Host 14 may have serial-to-IP converters (not shown) for converting Internet signals to RS 232 signals and vice versa. The field station IP Host 14 may further be communicatively coupled to a network 22, such as an Internet connection via, for example, satellite, cable modem, or the like. The IP Host 14 can collect radio signals from the units 12A, 12B, 12C, 12D, and 12E, convert them to Internet signals and transmit them to the customer server 16 via the network 22. In other words, the IP Host 14 may communicate with the one or more field units 12A, 12B, 12C, 12D, and 12E using a first communications protocol and may further communicate with the customer server 16 using a different protocol. In certain embodiments, the IP Host 14 may communicate with the field units 12A, 12B, 12C, 12D, and 12E using a field unit hopping protocol as described herein and communicate with the customer server 16 using transmission control protocol or Internet protocol (TCP/IP). Examples of serial-to-IP converters that are used in the field stations IP Host 14 are IP Host equipment Lantronix UDS-10 available from Lantronix of Irvine, Calif., a standard Internet Connection (such as satellite, cable, DSL, etc.), a transceiver (such as a 900 MHz Radio and 900 MHz Antenna), various interconnecting cables (such as LMR200 and LMR400 cable and connectors), a housing (such as a 24×20×8 steel enclosure capable of withstanding severe environmental conditions), and a serial-to-IP converter, the use of which would be apparent to one skilled in the art.

The IP Host 14 may include one or more processors therein running IP Host software 14B to control the various constituent components of the IP Host 14 and coordinate communications with the communications units 28 of the various field units 12A, 12B, 12C, 12D, and 12E. In one embodiment, the IP Host 14 may receive a request datagram from the customer server 16. The datagram may be sent via the network 22 using a suitable protocol, including, for example, TCP/IP. The request datagram, in one aspect, may provide instructions, or an indication of data to be collected and/or transmitted from a particular field unit 12A, 12B, 12C, 12D, and 12E. For example, the request datagram may indicate particular data to be provided to the customer server 16 from a particular field unit 12A, 12B, 12C, 12D, and 12E as collected by the sensors 20 on that field unit and/or stored on the memory or the customer monitor 19 of that field unit 12A, 12B, 12C, 12D, and 12E. In other words, the request datagram may provide instructions to fetch data elements from a particular field unit 12A, 12B, 12C, 12D, and 12E. Alternatively, the request datagram may provide any other suitable instructions to a target field unit 12A, 12B, 12C, 12D, and 12E, including, but not limited to, collecting data, storing data, fetching data, calculating one or more parameters based upon collected data, a remote control function, a physical actuation, or combinations thereof. In one aspect, the request datagram as transmitted by the customer server 16 may be received by the IP Host 14 and the IP Host 14 may generate a request packet based, at least in part, on the received request datagram and the native protocol of the customer server. The request packet may include, such as in a header section of the request packet, information to route the request packet to the destination field unit 12A, 12B, 12C, 12D, and 12E. In effect, the IP Host 14 may arrange for the customer server 16 to receive the information and/or data requested by the customer server 16 from a particular field unit 12A, 12B, 12C, 12D, and 12E by communicating the request to the field unit 12A, 12B, 12C, 12D, and 12E.

The customer server 16 may include one or more processors with customer server software 16B running thereon and one or more computer readable media to store the data received from the IP Host 14. Examples of servers and computer processors that are used at the customer server 16 include, by illustration only and not by way of limitation: an Internet connection (satellite, cable, DSL, etc.), a suitable server computer, a web server, preferably containing a suitable database access connector (such as ODBC, SQL, mySQL, Oracle and the like), a website code such as SilverSmith Web code and automatic polling software such as SilverSmith TRaineAuto Service. In one aspect, the customer server software 16B can coordinate communications between the customer server 16 and a human machine interface (HMI) 15A or the World Wide Web 15B. The HMI 15A can be an end terminal that is local or remote to the customer server 16, for accessing the customer server 16 by a user of the transport system 26. The Web 15B connection can also be used by users to access the customer server 16. Furthermore, satellite offices 18 may make use of the Internet to access the customer server 16. Via the access points 15A, 15B and 18, users may control the customer server 16 to provide communications, such as instructions and/or a request datagram, to the IP Host 14 to collect data from the distributed field units 12A, 12B, 12C, 12D, and 12E. The access points 15A, 15B, and 18 can also be used to access historical monitoring data stored on the customer server 16.

In one embodiment, the customer server software 16B running on the customer server can interact with the IP Host software 14B running on the IP Host 14 via the Internet 22 to receive data from and to provide instructions to the IP Host 14. Therefore, the IP Host 14 may receive instructions on what data to fetch from which field unit 12A, 12B, 12C, 12D, or 12E. Once the data is retrieved from the field units 12A, 12B, 12C, 12D, and 12E, the IP Host 14 can transfer the data to the customer server 16 using one or more open source or proprietary protocols. In other words, the customer server 16 may request a particular data from a particular field unit 12A, 12B, 12C, 12D, and 12E and send a request for the same to the IP Host 14 in the form of a request datagram. The request datagram may be transmitted by the customer server 16 over the network 22 and received by the IP Host 14 from the network using any suitable protocol. Examples of suitable protocols include TCP/IP, Modbus and DNP3. Upon the receiving the request datagram, the IP Host 14 may analyze the request datagram to determine from which field unit or units 12A, 12B, 12C, 12D, and 12E data is being requested by the customer server 16. Based at least in part on the analysis, the IP Host 14 may determine a hopping path to the field unit 12A, 12B, 12C, 12D, and 12E from which data has been requested by the customer server 16. Typically, the IP host 14 is programmed with a lookup table with one or more hopping paths for each of the field units 12A, 12B, 12C, 12D, and 12E. By determining the hopping path, the IP Host 14 adds the hopping path for each of the field units 12A, 12B, 12C, 12D, and 12E for which data is requested and transmits the datagram along the assigned hopping path or paths from one field unit field unit 12A, 12B, 12C, 12D, and 12E to another field unit 12A, 12B, 12C, 12D, and 12E until the request packet or a derived version of the request packet is received by the destination field unit 12A, 12B, 12C, 12D, and 12E. When the destination field unit 12A, 12B, 12C, 12D, and 12E receives the request data packet, the destination field unit 12A, 12B, 12C, 12D, and 12E may retrieve data from memory on the respective customer monitor 19 responsive to the received request data packet.

The detailed methods and processes for transmitting commands and inquiries from the customer server 16, through the Internet 22, to the appropriate IP Host 14, through the RF network, and to the destination units 12A, 12B, 12C, 12D, and 12E are described herein. Once the destination field unit 12A, 12B, 12C, 12D, and 12E receives the commands in the form of the request data packet, the field unit 12A, 12B, 12C, 12D, and 12E may identify the destination address from the request packet and add the hopping path and send the packet to the radio network. The destination field unit 12A, 12B, 12C, 12D, and 12E may further transmit a response back through the RF network to the IP Host 14 in the form of the response data packet. The transmission of the response data packet may be performed by "component hopping," where the response data packet, or a variation thereof, may be transmitted from one field unit 12A, 12B, 12C, 12D, and 12E to another field unit 12A, 12B, 12C, 12D, and 12E, along a predetermined path until the response data packet, incorporating the requested data, is received by the IP Host 14. In certain embodiments, the predetermined component hopping path from the destination field unit 12A, 12B, 12C, 12D, and 12E to the IP Host 14 may be exactly the inverse route of the path from the IP Host 14 to the destination field unit 12A, 12B, 12C, 12D, and 12E. Therefore, in these embodiments, the path to and from the destination field unit 12A, 12B, 12C, 12D, and 12E may be predetermined at the IP Host 14 by, for example, the IP Host software 14B.

Once the IP Host 14 receives the response data packet from the field unit 12A, 12B, 12C, 12D, and 12E from where data was requested, the IP Host 14 may perform another protocol conversion from the component hopping protocol used to communicate between the IP Host 14 and the field unit 12A, 12B, 12C, 12D, and 12E, to the network 22 protocol, such as TCP/IP. In other words, the IP Host 14 may strip the hopping path address from the response data packet. The response data packet is then sent to the customer by way of the Internet 22 or any other suitable communication system. In one embodiment, the IP Host 14 may transmit the generated response datagram through the Internet 22 to the customer server 16. Furthermore, the satellite office 18 can download data from the customer server 16 and can likewise submit a command to and receive a response from the destination field unit 12A, 12B, 12C, 12D, and 12E. For brevity, the remainder of the document will refer to the customer server 16 as the remote location when describing communication between the remote location and each of the field units 12A, 12B, 12C, 12D, and 12E; however, it is to be understood that in certain embodiments, the satellite office 18 can be substituted for and function as the customer server 16.

The software service provider 24 may be used to set-up and/or configure the IP Host 14 and particularly the IP Host software 14B running thereon. In certain embodiments, the software service provider 24 may push the IP Host software 14B on to the IP Host 14. In other words, the IP Host 14 may be installed with the IP Host software 14B over the network 22. Furthermore, the IP Host software 14B may be configured over the network 22, with or without human involvement. The configuration may entail providing the IP Host software 14B with the capability to receive the request datagram from the customer server 16 in a format and/or protocol unique to that customer server 16 and interpret the same for the particular destination of the request packet. Therefore, in one aspect, the configuration and/or set-up of the IP Host software 14B enables a customer to use any suitable format or protocol of communications with the IP Host 14 of the customer's choice. The IP Host software 14B is configured such that it can receive a communication from the customer server in any pre-established format or protocol and extract pertinent information as to the destination of the data request from the communication to further fetch data from the field units 12A, 12B, 12C, 12D, and 12E. It will be appreciated that the configuration of the IP Host software 14B also enables seamless communications from the IP Host 14 to the customer server 16. In other words, the IP Host software 14B may be configured by the software service provider 24 such that it can receive response data packets from one or more field units 12A, 12B, 12C, 12D, and 12E, and generate a response datagram based at least in part on the received response data packet that is in the format and/or protocols used by the customer server 16.

Within the monitoring network 10, the field units 12A, 12B, 12C, 12D, and 12E communicate by "component hopping," wherein the field unit 12A, 12B, 12C, 12D, and 12E transmit information in a series rather than each individual field unit 12A, 12B, 12C, 12D, and 12E communicating directly with the IP Host 14. For example, in FIG. 1, if the customer server 16 sends a command to unit 12D with ID $(U_1U_2U_3U_4)_4$, the information is sent to the IP Host 14, then to unit 12A $(U_1U_2U_3U_4)_1$ which is then hopped on to unit 12D $(U_1U_2U_3U_4)_4$. Transmission of information back to the customer server 16 is accomplished in the same manner but in the reverse direction. The "component hopping" system permits efficient and expedient communication between field units 12A, 12B, 12C, 12D, and 12E and transmission of information to and from the associated communications units 28

The remote monitoring communications system 10, as disclosed herein, is suitable for monitoring any physical data systems, such as oil and gas wells, natural gas tanks, power distribution systems, or transportation systems, or any other application that can benefit from remote monitoring of geographically distributed monitors. It will be appreciated that examples of applying the remote monitoring communications system 10 to particular applications throughout the application should, by no means, be considered a limitation in the application of the remote transport system 26 to other applications. In certain embodiments, the field units 12A, 12B, 12C, 12D, and 12E may be of mixed type, where, various types of distributed monitoring may be accomplished using a single remote monitoring communications system 10. As a non-limiting example, a single remote communications system 10 may be used for both traffic monitoring and power distribution system monitoring.

The protocol for transmission of information packets in the remote monitoring communications system 10 will now be described with reference to the flowchart of FIGS. 2A and 2B. The IP Host 14 houses route path data for all of the field units 12A, 12B, 12C, 12D, and 12E. The route path data contain details about the paths the information packets must follow within the RF network in order to reach the desired field units 12A, 12B, 12C, 12D, and 12E; therefore, each field unit 12A, 12B, 12C, 12D, and 12E has one or more route paths.

Figure 2A:
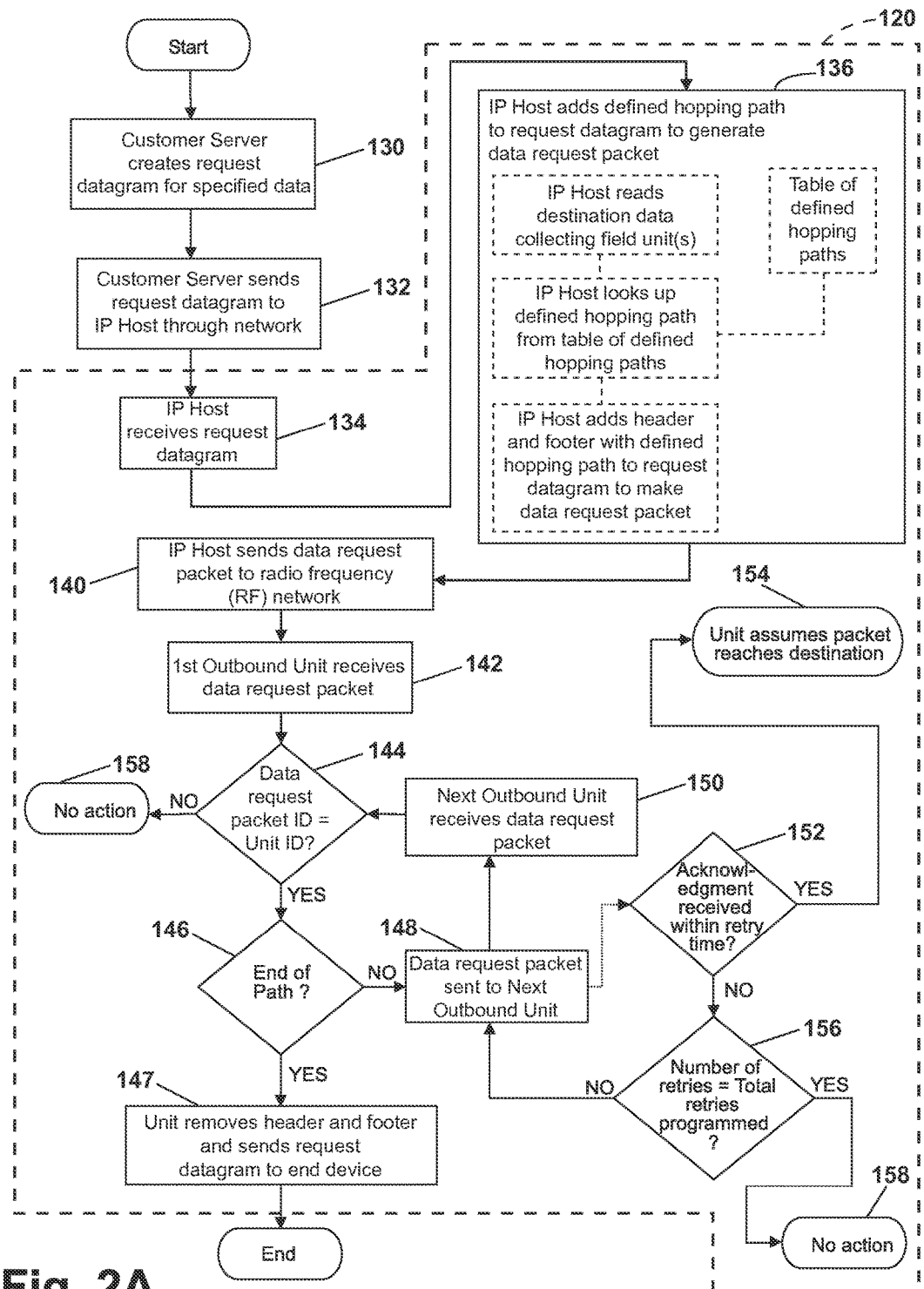
FIGS. 2A and 2B is a flowchart depicting an example method of communication between a customer server and a destination field unit of the remote monitoring system in FIG. 1 in accordance with certain embodiments of the invention.
Figure 2B:
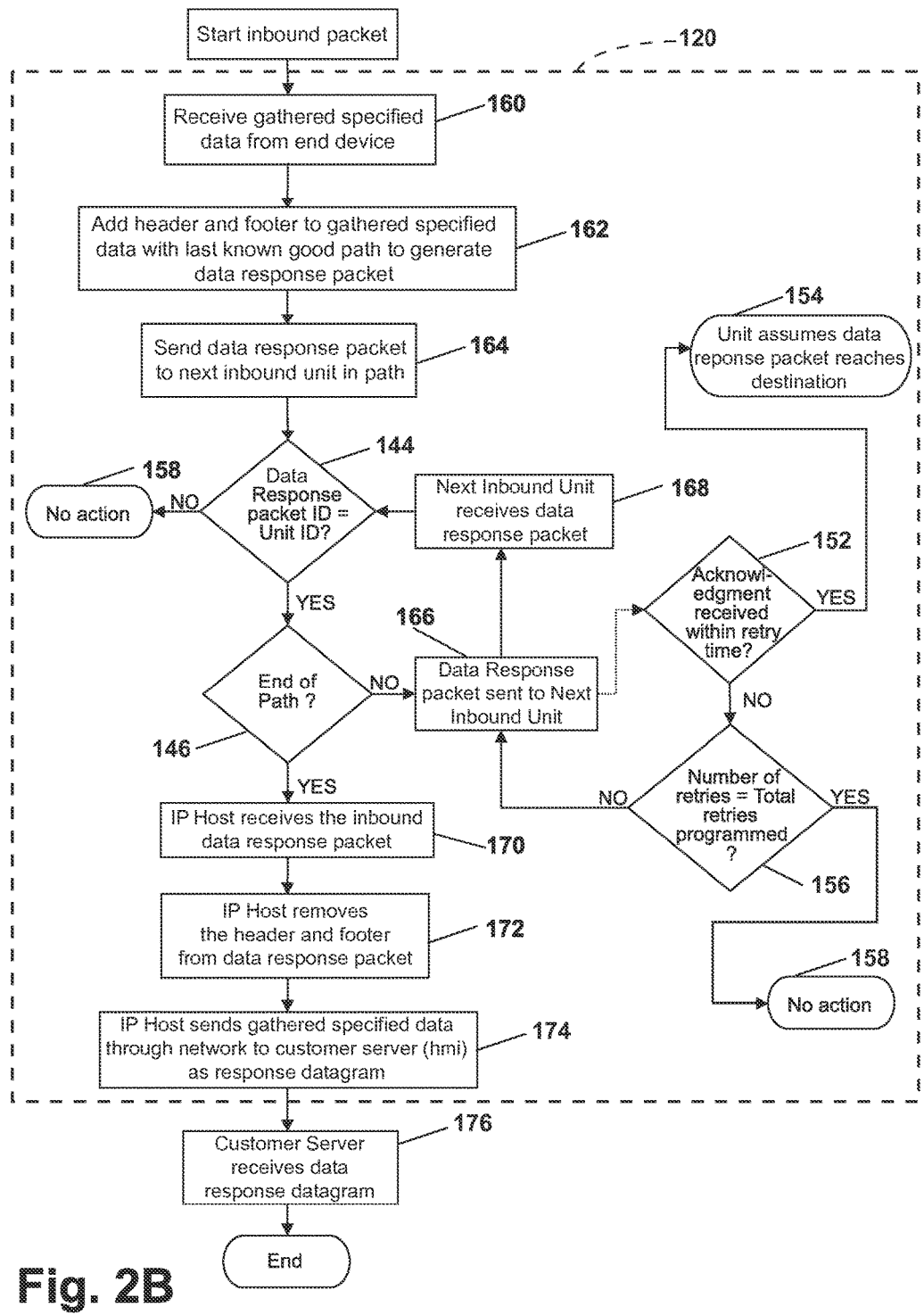

In FIGS. 2A and 2B, a method according to the invention for seamless wireless transport of datapackets or datagrams between a customer server and a remote field unit that lies within a remote geographic region with multiple geographically proximate, data-collecting field units is contained within the dotted lines 120. At block 130, the customer server 16 may generate a request datagram. The request datagram may be generated by the customer server software 16B running on the processor(s) of the customer server 16. In one embodiment, the request datagram may be generated based, at least in part, on user input via, for example, the web 15B, the HMI 15A, or any one of the satellite offices 18. At block 132, the customer server may send the request datagram to the IP Host 14. The transmission may be via Internet based protocols, such as TCP/IP and over the network 22. In certain embodiments, the transmission may be secure and/or encrypted by any variety of encryption mechanisms. In this case, the transmission may be encrypted by the customer server software 16B and may require decryption at the IP Host 14 by the IP Host software 14B. At block 134, the IP Host 14 may receive the request datagram. In certain embodiments the IP Host 14 and the IP Host software 14B running thereon may need to decrypt the received request datagram. The request datagram may be indicative of what data is requested and from which field unit 12A, 12B, 12C, 12D, and 12E. In one embodiment, the IP Host 14 does not analyze the request datagram to ascertain the data that needs to be fetched by the remote monitoring communications system 10 and provided to the customer server 16 but in some cases may do so.

At block 136, the IP Host 14 adds to the request datagram a predefined hopping path to generate a data request packet. The routing path of the destination of the data collecting field unit 12A, 12B, 12C, 12D, and 12E may be identified by the IP Host. The IP Host 14 can be configured with a table of defined hopping paths for each of the field units 12A, 12B, 12C, 12D, and 12E and the IP Host selects a defined hopping path for a destination data collecting field unit from the table of defined hopping paths. The IP Host 14 looks up the defined hopping path of a destination field unit by accessing the lookup table of predefined hopping paths stored in memory on the IP Host 14 or accessible by the IP Host 14. Once the appropriate hopping path is determined, the IP Host 14 may generate a request packet by adding a header and footer with the predefined hopping path to the request datagram. The request packet may contain information such as the command to be executed by the destination field unit 12A, 12B, 12C, 12D, and 12E, the unit identification number, and the hopping path. Next, at block 140, the IP Host 14 may transmit the data request packet over the RF network. Typically, each field unit 12A, 12B, 12C, 12D, and 12E has a preferred hopping path and one or more alternate hopping paths. In the event of failure of any of the field unit 12A, 12B, 12C, 12D, and 12E along a preferred path, the data can follow an alternate path. After a predetermined number of failed attempts, such as five failed attempts, on a path, the IP Host 14 will try the next path based on its preference which may be an ordered list of possible paths.

An example of a format for the request packet formed by the IP Host is SS CC UUUU CCCC TT MM RRR . . . DDD . . . XXXX, wherein the each portion of the request packet is as follows:

| REQUEST PACKET | DESCRIPTION |
| --- | --- |
| SS | two digit start bit |
| CC | two digit control number |
| UUUU | four digit unit identification number of the next unit along path |
| CCCC | four digit company number |
| TT | two digit count of total hops required to reach the destination unit |
| MM | two digit count of hops made |
| RRR . . . | complete route path to reach the destination unit |
| DDD . . . | complete packet from the customer server |
| XXXX | four digit cyclic redundancy check (CRC) |

The request packet control number will vary depending upon the native protocol of the customer server 16. In this example, the packet control number ends in an odd digit, which instructs the units 12A, 12B, 12C, 12D, and 12E that the packet is outbound.

The DDD . . . portion of the request data packet can contain the raw packet received by the IP Host 14 to be delivered to the customer monitor 19. Finally, the four digit Cyclic Redundancy Check (CRC) at the end of the request packet is the checksum of the bytes in the packet and is an error-detecting code used to verify that the entire packet has been transmitted correctly. If the bytes received by the units 12A, 12B, 12C, 12D, and 12E does not sum to the CRC number, then the unit 12A, 12B, 12C, 12D, and 12E knows that the packet is incomplete. The CRC check system is a successful and proven quality control tool. The request packet can be of any format suitable for transmission from the customer server 16, to the IP Host 14, and through the monitoring network 10 and is not limited to the format described herein. It is only required that the request packet contain desired commands and the information necessary to reach the destination field unit 12A, 12B, 12C, 12D, and 12E.

The IP Host 14 transmits the request packets to the destination field unit 12A, 12B, 12C, 12D, and 12E using the component hopping mechanism enabled by the request data packet. The first outbound unit 12A, which is the unit 12A, 12B, 12C, and 12D in closest proximity to the IP Host 14, receives the data request packet at block 142 and may compare the unit ID in the request packet to its own programmed unit ID at block 144. If the unit IDs do not match, no action is taken at block 158. If, however, the units IDs do match, then the field unit determines whether the end of the predetermined path has been reached at block 146. This determination may be made by, for example, determining whether the number of hops made (MM) equals the total hops required to reach the destination unit (TT). If MM and TT are not equal, the current field unit may change the unit ID in the request data packet to that of the next outbound field unit, increase the number of hops made, and transmit the request packet to the next outbound unit at block 148. Upon receipt of the data request packet by the next outbound field unit at block 150 the same procedures may be followed by the next field unit by comparing unit IDs at block 144 and comparing the number of hops made to the total number of hops required at block 146. These procedures are repeated until the data request packet reaches the destination unit at which point, MM and TT are equal. The field unit may determine the predetermined end of the path has been reached and then may remove the header and footer from the data packet and send the resulting request datagram to the end device at block 147.

After receipt of the data request packet, the communications unit 28 at the destination field unit 12A, 12B, 12C, 12D, and 12E sends the data request packet to the customer monitor 19 to execute the command sent from the customer server. The communications unit 28 may generate a data response packet with the raw packet from the customer monitor 19. The customer monitor 19 at the destination field unit sends the thus generated data response packet to the communications unit 28 at the destination field unit 12A, 12B, 12C, 12D, and 12E which then changes the control number of the hopping path on the data response packet to create a reverse hopping path back to the IP Host 14. The reverse hopping path is added to the header and footer of the data response packet at block 162. The response packet format can be similar to that of the request packet; however, the control number must end in an even digit to instruct the field units 12A, 12B, 12C, 12D, and 12E that the packet is inbound.

The DDD . . . portion of the response packet can contain the data requested by the customer server 16. The response packet can be of any format suitable for transmission from the destination unit 12A-E, through the monitoring communications network 10, and to the IP Host 14 and is not limited to the format described herein. It is only required that the response packet contain the desired commands and the information necessary to reach the customer server 16 via the IP Host 14.

Following the generation of the response packet at block 162, the destination unit may transmit the response packet to the next inbound unit at block 164. The response packet may travel back through the RF network in the same manner ("component hopping") that the request packet is sent to the destination unit. In particular, the response packet hops from field unit 12A, 12B, 12C, 12D, and 12E to field unit 12A, 12B, 12C, 12D, and 12E via processes at blocks 144, 146, 166, and 168, until it reaches the IP Host 14 at block 170. Next, the IP Host 14 may generate a response datagram based at least in part on the response data packet at block 172 by removing the header and footer from the data response packet. In one embodiment, the response datagram may incorporate the data and/or information that was transmitted from the destination field unit 12A, 12B, 12C, 12D, and 12E to the IP sever 14 responsive to the request data packet. In particular, the IP Host 14 can strip the hopping path from the data response packet form the response datagram. The response datagram may, in one aspect, be configured to be transmitted via the network 22 via an appropriate network protocol, such as TCP/IP. At block 174, the IP Host 14 sends the gathered specified data via the response datagram IP Host to the customer server 16. When the customer server 16 receives the response datagram at block 174, the data may be read and stored.

As the request and response packets are sent from one field unit 12A, 12B, 12C, 12D, and 12E to the next field unit 12A, 12B, 12C, 12D, and 12E in the transport system 26, the sending unit waits for an acknowledgment that the next unit has received the packet at block 152. The acknowledgment is either receipt of the response packet or the next unit's repeat. If the acknowledgment is obtained within a programmed retry time, then the sending unit assumes at block 154 that the packet has reached its destination. However, if the acknowledgment is not received within a programmed retry time, then the sending unit compares the number of retries with a predetermined total number of allowed retries programmed in the unit at block 156. No action is taken if the number of retries equals the number programmed at block 158, but if the number of retries does not equal the number programmed, then the sending unit again transmits at block 148 or block 166 the request or response packet to the next inbound unit.

The transport system 26 uses the Internet and RF bands as the main body of communication between components and remote locations. These communication methods are well known, robust, easily accessible, and cost effective. The "component hopping" serial arrangement is inherently efficient, permits facile communication between components clustered together or distant from each other within a field, and does not require complex equipment in order to transmit information to a remote location. Additionally, the system itself has several quality control functions, such as CRC and acknowledgment features, to ensure that communication, which includes commands for controlling in addition to monitoring components, between the components and the remote location is effectual and accurate. As a result, installation and repair of the system equipment requires less manpower, heavy machinery, time, and financial resources. Furthermore the system consumes a relatively low amount of power as the integrated communications module and controller of the communications unit 28 only need to communicate over short distances to adjacent field units 12A-D, rather than directly with the IP Host 14 enabling the use of lower power radio transmissions. Additional power savings are realized due to the relatively infrequent polling and transmission of the component data. Also, because of the relatively low power and infrequent radio transmissions, there is reduced radio traffic and congestion and therefore reduced probability of radio transmission interference.

As described above, outbound packets (also referred to as request packets) are identified by an odd-numbered control number CC and inbound packets (also referred to as response packets) are identified by an even-numbered control number CC. It will be understood that, in order to move along a path, a request packet is sent out with an odd-numbered control number which indicates that the receiving component should locate the next component in the path by moving to the right in the path string (i.e., to the Next Outbound Unit) and, once a response packet is created by the destination component, the response packet (containing an even-numbered control number) is delivered to the source by moving to the right along the path string (i.e., to the Next Inbound Unit).

The delivery of a request packet to a desired unit will now be described. An initial request packet is formed at the IP Host 14 by determining (1) which unit is to be contacted and, once a destination unit is identified, (2) selection of a first selected path along which the communications packet will be sent.

The first packet is then formed as shown in the table below. It should be noted that the UUUU segment contains the Next Outbound Unit in the path selected by reviewing the path RRR segment. The Next Outbound Unit is selected from the path RRR by first determining whether the control number is odd or even and moving one path segment to the right or left, respectively. Since the packet being sent is a request packet, the control number will be odd, therefore the Next Outbound Unit is selected as 0002 and this address is placed into the UUUU segment of the request packet. Also, the number of hops in path segment RRR is analyzed to determine the total number of hops TT in the path segment. This value has been initialized to 04 in this example (e.g., four hops: 9999-to-0002, 0002-to-0005, 0005-to-0008 and 0008-to-0012). The number of completed hops segment MM is initialized to 01 (since this is the first hop). Then, the packet is transmitted.

| REQUEST PACKET SEGMENT | SAMPLE PACKET DATA |
|---|---|
| SS | XX |
| CC | XX (odd for request packet) |
| UUUU | 0002 |
| CCCC | XXXX |
| TT | 04 |
| MM | 01 |
| RRR . . . | 9999 0002 0005 0008 0012 |
| DDD . . . | customer raw packet |
| XXXX | XXXX (cyclic redundancy check) |

Since the UUUU segment contains unique ID 0002, this packet will be received by unit 0002. The test for "end of path" is performed on the path segment RRR. This "end of path" test can be performed in a multitude of ways, some examples of which are described here.

For example, an "end of path" test can be the number of hops test described above. The number of hops segment TT is initialized at the IP Host 14 by analysis of the path segment RRR and determining the number of unique hops needed to complete the path segment RRR and the number of current hops segment MM is initialized to 01 to set the packet initially at a single current hop. Each "hop" along the segments of the path cause the current hops segment MM to be incremented. When the number of current hops MM equals the total number of hops TT, the trip is complete since the path was followed to its completion.

Another "end of path" test could be performed by simply including the unique ID of the final destination as a segment of the request packet and the unique ID of the destination unit can be compared with the ID of the receiving unit. If they are the same, the packet is at the destination unit.

For this example, the number of hops end of path test will be described. Once the above packet is received at unit 0002, the following acts are performed. First, the ID segment UUUU is analyzed and compared to the receiving unit's ID. Since both are 0002, processing continues (otherwise this packet would be ignored by another unit not having ID 0002 that detects the packet). Next, the number of hops MM (01) is compared to the total number of hops (04). Since they are not equal, the request packet is not at the end of the line. Therefore, since the control code segment CC is odd, the unit (0002) retrieves the path segment, locates the 0002 ID in the path, determines the Next Outbound Unit (0005 in this case) and inserts the ID of the Next Outbound Unit into the destination segment UUUU in the request packet. The unit 0002 also increments the current number of hops MM so that the request packet sent on to the Next Outbound Unit 0005 appears as follows:

| REQUEST PACKET SEGMENT | SAMPLE PACKET DATA |
|---|---|
| SS | XX |
| CC | XX (odd for request packet) |
| UUUU | 0005 |
| CCCC | XXXX |
| TT | 04 |
| MM | 02 |
| RRR . . . | 9999 0002 0005 0008 0012 |
| DDD . . . | customer raw packet |
| XXXX | XXXX (cyclic redundancy check) |

Since unit 0005 is also not the end destination, the same acts are performed on the request packet by unit 0005:

| REQUEST PACKET SEGMENT | SAMPLE PACKET DATA |
|---|---|
| SS | XX |
| CC | XX (odd for request packet) |
| UUUU | 0008 |
| CCCC | XXXX |
| TT | 04 |
| MM | 03 |
| RRR . . . | 9999 0002 0005 0008 0012 |
| DDD . . . | customer raw packet |
| XXXX | XXXX (cyclic redundancy check) |

Again, since unit 0008 (i.e., the latest identified Next Outbound Unit) is also not the end destination, the same acts are performed on the request packet:

| REQUEST PACKET SEGMENT | SAMPLE PACKET DATA |
|---|---|
| SS | XX |
| CC | XX (odd for request packet) |
| UUUU | 0012 |
| CCCC | XXXX |
| TT | 04 |
| MM | 04 |
| RRR . . . | 9999 0002 0005 0008 0012 |
| DDD . . . | customer raw packet |
| XXXX | XXXX (cyclic redundancy check) |

Now, when this packet is received by unit 0012, the "end of path" test is performed. In this case using the number of hops test, the current number of hops MM (04) equals the total number of hops TT (04), signifying that the trip to the destination unit is complete. Unit 0012 then delivers the customer raw packet to the customer monitor 19.

If a response packet is sent from the customer monitor 19 then the communications unit 28 adds the last known good path, sets the total hops to 01 and the Next Inbound Unit identified in the UUUU segment, for example, in the form of:

| RESPONSE PACKET SEGMENT | SAMPLE PACKET DATA |
|---|---|
| SS | XX |
| CC | XX (even for response packet) |
| UUUU | 0008 |
| CCCC | XXXX |
| TT | 04 |
| MM | 01 |
| RRR . . . | 9999 0002 0005 0008 0012 |
| DDD . . . | customer raw packet |
| XXXX | XXXX (cyclic redundancy check) |

The response packet is sent to the Next Inbound Unit (i.e., 0008) which performs the same retransmission acts on the response packet as it did on the request packet—resulting in a retransmitted response packet to the Next Inbound Unit (0005) in the form of:

| RESPONSE PACKET SEGMENT | SAMPLE PACKET DATA |
|---|---|
| SS | XX |
| CC | XX (even for response packet) |
| UUUU | 0005 |
| CCCC | XXXX |
| TT | 04 |
| MM | 02 |

-continued

| RESPONSE PACKET SEGMENT | SAMPLE PACKET DATA |
| --- | --- |
| RRR . . . | 9999 0002 0005 0008 0012 |
| DDD . . . | customer raw packet |
| XXXX | XXXX (cyclic redundancy check) |

Unit 0005, again not the destination unit, retransmits the response packet as:

| RESPONSE PACKET SEGMENT | SAMPLE PACKET DATA |
| --- | --- |
| SS | XX |
| CC | XX (even for response packet) |
| UUUU | 0002 |
| CCCC | XXXX |
| TT | 04 |
| MM | 03 |
| RRR . . . | 9999 0002 0005 0008 0012 |
| DDD . . . | customer raw packet |
| XXXX | XXXX (cyclic redundancy check) |

Unit 0002, again not the destination unit, retransmits the response packet as:

| RESPONSE PACKET SEGMENT | SAMPLE PACKET DATA |
| --- | --- |
| SS | XX |
| CC | XX (even for response packet) |
| UUUU | 9999 |
| CCCC | XXXX |
| TT | 04 |
| MM | 04 |
| RRR . . . | 9999 0002 0005 0008 0012 |
| DDD . . . | customer raw packet |
| XXXX | XXXX (cyclic redundancy check) |

Since the "end of path" test now passes, the receiving field unit (the IP Host 14 identified by ID 9999 in this example) knows that it is the final destination of the response packet and processes the data contained in the packet accordingly.

In the field, the integrated communications module and controller of the communications unit 28 can be provided power in the field from a battery, such as a rechargeable battery, and a solar panel. Additionally, to reduce power consumption, the integrated communications module and controller of the communications unit 28 can be selectively powered up. For example, communications between the IP Host 14 and the field units 12A-E may be allowed only at predetermined times during the day.

Figure 3:
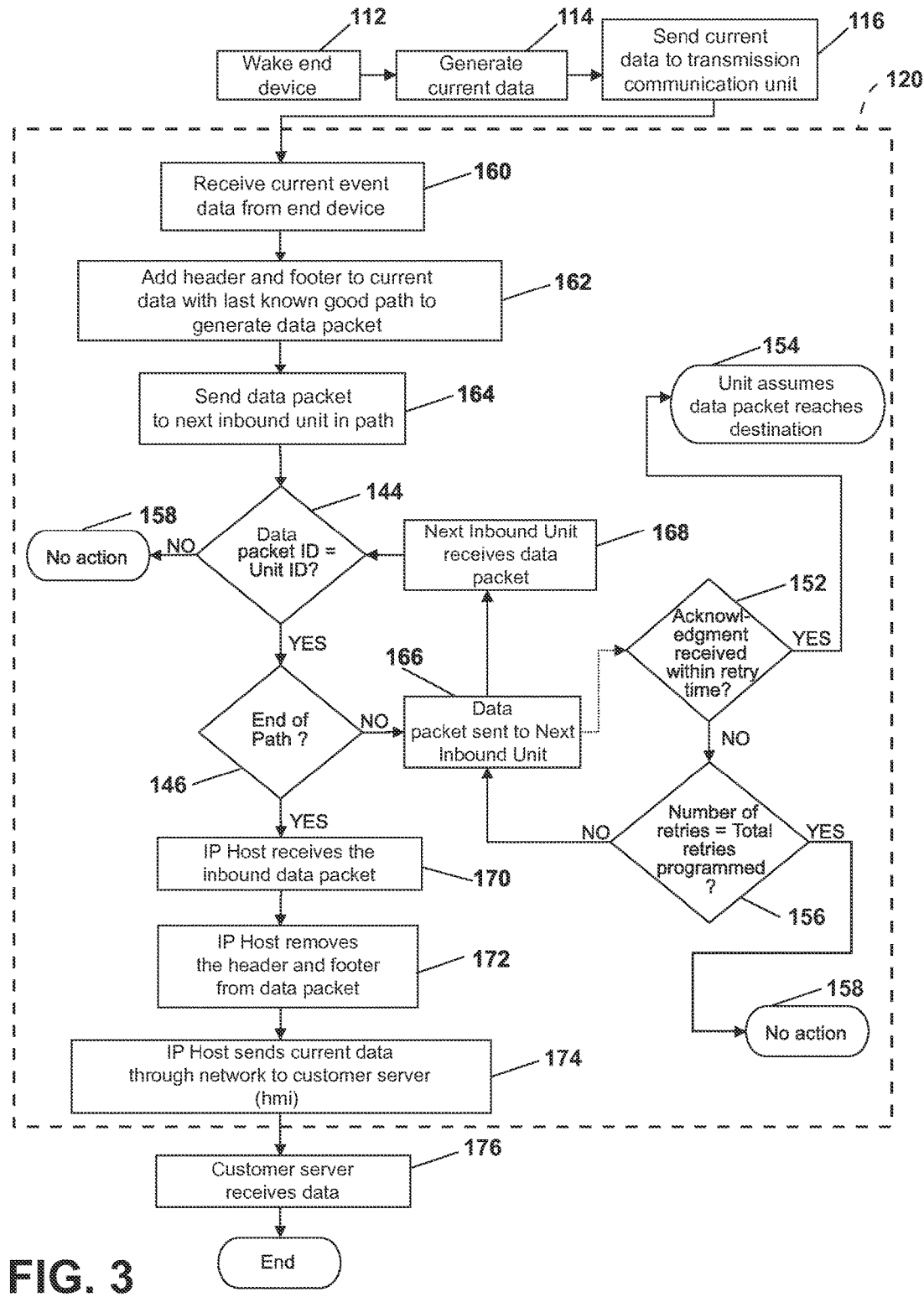
FIG. 3 is a flowchart depicting an example method of communication from a destination field unit to a customer server according to an embodiment of the invention.

In one implementation of the remote monitoring and data collection system, the data-collecting monitors 19 may initiate communication by transmitting monitored data to either one of the communication units 28 or directly to the IP Host 14 without responding to a request from the customer server 16. Referring now to FIG. 3, a method according to the invention for the transfer of data packets from one of the multiple geographically proximate, data-collecting monitors 19 to a customer server 16 without an initial request from the customer server 16. Initially, the monitor 19 may be in a low-power sleep mode. In response to an event that may include a predetermined timer or detection of an alarm, a trigger may wake the monitor 19 at block 112. Once awake, the monitor 19 may generate a report of current data at block 114. These data may include information encoding the type of event detected or system being monitored, an identifier for the particular monitor, a timestamp and a pre-programmed hopping path. At block 116, the monitor 19 may send the current data to the communication unit 28 that is indicated by the pre-programmed hopping path.

The communications unit 28 indicated by the pre-programmed hopping path may receive the current data at block 160. Then, at block 162, the communications unit 28 may generate a current data packet for transmission along the data transport system 26. The current data packet can be of any format suitable for transmission through the monitoring system 10 and while it may be of the format described above, it is not limited to the format described herein. It is only required that the current data packet contain the information necessary to reach the IP Host 14 and the customer server 16.

Following the generation of the current data packet at block 162, the destination communications unit 28 may transmit the current data packet to the next inbound data communications unit 28 at block 164. The current data packet may travel through the RF network by component hopping such that the current data packet is sent to the along a predetermined path of communications units 28 until it arrives at the IP Host 14. In particular, the current data packet hops from communications unit 28 to communications unit 28 via processes at blocks 144, 146, 166, and 168, until it reaches the IP Host 14 at block 170. The next inbound communications unit 28 receives the current data packet and may compare the unit ID in the current data packet to its own programmed unit ID at block 144. If the unit IDs do not match, no action is taken at block 158. If, however, the units IDs do match, then the unit determines whether the end of the predetermined path has been reached at block 146. This determination may be made by, for example, determining whether the number of hops made (MM) equals the total hops required to reach the destination unit (TT). If MM and TT are not equal, the current communications unit may change the unit ID in the current data packet to that of the next inbound communications unit, increase the number of hops made, and transmit the current data packet to the next inbound communications unit at block 166. Upon receipt of the current data packet by the next inbound unit at block 168, the same procedures may be followed by the next communications unit by comparing unit IDs at block 144 and comparing the number of hops made to the total number of hops required at block 146. These procedures are repeated until the current data packet reaches the IP Host at block 170 at which point, MM and TT are equal.

At block 172, the IP Host 14 may remove the header and footer from the current data packet. In one embodiment, the response datagram may incorporate the current data and/or information that were transmitted from the monitor 19 to the communications unit 28 at block 116. In particular, the IP Host 14 can strip the hopping path from the current data packet to configure the current data to be transmitted via the network 22 via an appropriate network protocol, such as TCP/IP. At block 174, the IP Host 14 sends the current data via the IP Host 14 to the customer server 16. When the customer server 16 receives the current data at block 176, the current data may be read and stored. The transmission may be via Internet-based protocols, such as TCP/IP and over the network 22. In certain embodiments, the transmission may be secure and/or encrypted by any variety of encryption mechanisms. In this case, the transmission may be encrypted by the IP Host 14 by the IP Host software 14B and may require decryption at the customer server software 16B.

As the current data packets are sent from one communications unit 28 to the next communications unit 28 in the transport system 26, the sending communications unit 28 waits for an acknowledgment that the next unit has received the current data packet at block 152. The acknowledgment is either receipt of the current data packet or the next unit's repeat. If the acknowledgment is obtained within a programmed retry time, then the sending communications unit 28 assumes at block 154 that the current data packet has reached its destination. However, if the acknowledgment is not received within a programmed retry time, then the sending unit compares the number of retries with a predetermined total number of allowed retries programmed in the unit at block 156. No action is taken if the number of retries equals the number programmed at block 158, but if the number of retries does not equal the number programmed, then the sending communications unit 28 again transmits at block 166 the current data packet to the next inbound communications unit 28.

The invention provides systems and methods for gathering data from one or more remote locations and can be installed with a relatively minimum level of set up on a customer server and the equipment to gather the data can be installed in the field with relatively minimum technical assistance. The servicing of the system takes place through connections to the Internet without any modification of the customer server. The invention eliminates detailed programming of the messaging system at customer server and different programs to match each protocol of multiple diverse customers. In addition, the invention provides a package of hardware that can be installed in the field without any special expertise in vendor hopping systems. In the case where the monitors wake-up to periodically transmit current data without responding to a request, additional power savings that may further minimize the need for servicing of the system may be realized due to the relatively infrequent transmission of the current data.

The systems and methods disclosed herein enable remote data collection and provisioning from a customer server that may operate and communicate using formats and protocols particular to that customer server. The IP Host 14 may receive a communication and request for data from the customer server in the customer specific format or protocol of the customer server. The IP Host 14 may then communicate with remote field units using a hopping communication protocol from the field stations that correspond with the request from the customer server. Therefore, in effect, the IP Host 14 may communicate with the customer server in any suitable format selected by the customer and may further execute the process of retrieving information and/or data from remote sites in yet another protocol.

The forgoing embodiments may be reflected in any one or more of the following claimed combinations or permutations thereof:

1. A method for transporting datapackets or datagrams between a customer server and a first remote data-collecting field unit that lies within a remote geographic region with multiple geographically proximate, data-collecting field units comprises:

sending from the customer server, through a network, a request datagram for specified data from the first remote, data collecting field unit to an IP Host;

adding to the request datagram, at the IP Host, a first defined hopping path that includes the first geographically remote data collecting field unit and at least one of the other multiple geographically proximate, data-collecting field units to generate a data request packet;

sending the data request packet to the first geographically remote data collecting field unit along the first defined hopping path to the first remote, data collecting field unit; and delivering the datagram as received by the IP Host from the customer server to the first geographically remote data collecting field unit.

2. The method for transporting datapackets or datagrams according to any one of claim 1 or 43 and further comprising:

transmitting a response datagram back to the IP Host along a second defined hopping path that includes the IP Host and at least one of the other multiple geographically proximate, data-collecting field units.

3. The method for transporting datapackets or datagrams between a customer server and a remote field unit according to claim 2 and further comprising transmitting the response datagram from the IP Host to the customer server through a network.

4. The method for transporting datapackets or datagrams between a customer server and a remote field unit according to any one of claims 1-3 wherein the IP Host is geographically remote from the customer.

5. The method for transporting datapackets or datagrams between a customer server and a remote field unit according to any one of claims 1-4 wherein the IP Host is geographically proximate to one or more of the geographically-spaced data-collecting field units.

6. The method for transporting datapackets or datagrams between a customer server and a remote field unit according to any one of claims 1-5 wherein the request datagram includes the identification of the first geographically remote data collecting field unit, and the IP Host reads the identification of the first geographically remote data collecting field unit in the request datagram as part of the act of adding the first defined hopping path to the request datagram.

7. The method for transporting datapackets or datagrams between a customer server and a remote field unit according to claim 6 wherein the IP Host has a table of defined hopping paths for each of the multiple geographically proximate, data-collecting field units and first defined hopping path for the first geographically remote data collecting field unit is selected from the table of defined hopping paths as part of the act of adding the first defined hopping path to the request datagram.

8. The method for transporting datapackets or datagrams between a customer server and a remote field unit according to any one of claims 1-7 wherein the IP Host adds a header and footer with the first defined hopping path to the request datagram.

9. The method for transporting datapackets or datagrams between a customer server and a remote field unit according to any one of claims 1-8 wherein the second defined hopping path for the data response packet is the last known good path between the first geographically remote data collecting field unit and the IP Host.

10. The method for transporting datapackets or datagrams between a customer server and a remote field unit according to claim 9 wherein the last known good path is the last path used to deliver the request packet in the reverse direction.

11. The method for transporting datapackets or datagrams between a customer server and a remote field unit according to any one of claims 1-10 wherein the network through which the request datagram and the response datagram is sent is the Internet.

12. The method for transporting datapackets or datagrams between a customer server and a remote field unit according to any one of claims 1-11 wherein the customer and the IP Host are at least outside the reach of RF communication.

13. The method for transporting datapackets or datagrams between a customer server and a remote field unit according to any one of claims 1-12 wherein the each of the multiple geographically proximate, data-collecting field units are geographically within the range of 1 to 10 miles of at least one other of the multiple geographically proximate, data-collecting field units.

14. The method for transporting datapackets or datagrams between a customer server and a remote field unit according to any one of claims 1-13 wherein each of the multiple geographically proximate, data-collecting field units is within RF range of at least one other of the multiple geographically proximate, data-collecting field units.

15. The method for collecting transporting datapackets or datagrams between a customer server and a remote field unit according to any one of claims 1-15 wherein the transmitting act includes transmission of the response datagram through an RF network.

16. The method for transporting datapackets or datagrams between a customer server and a remote field unit according to claim 15 wherein the RF network is 900 MHz frequency radio waves.

17. The method for transporting datapackets or datagrams between a customer server and a remote field unit according to claim 14 wherein the geographic spacing of the multiple geographically proximate, data-collecting field units is less than 5 miles apart.

18. The method for transporting datapackets or datagrams between a customer server and a remote field unit according to any one of claims 1-17 wherein the remote geographic region with multiple geographically proximate, data-collecting field units is outside of wireless communication proximity from the customer server.

19. The method for collecting transporting datapackets or datagrams between a customer server and a remote field unit according to claim 18 wherein the IP Host is geographically within wireless communication proximity to one or more of the multiple geographically proximate, data-collecting field units.

20. The method for transporting datapackets or datagrams between a customer server and a remote field unit according to claim 19 wherein the wireless communication proximity is RF wireless communication.

21. The method for transporting datapackets or datagrams between a customer server and a remote field unit according to claim 8 wherein the act of delivering the datagram includes stripping the header and footer from the request datagram and delivering the request datagram to a customer monitor.

22. The method for transporting datapackets or datagrams to and from remote field unit according to claim 21 and further comprising receiving specified data from a customer monitor at the remote field unit and adding to the specified data the second or last known good hopping path.

23. The method for transporting datapackets or datagrams between a customer server and a remote field unit according to any one of claims 1-22 wherein the act of sending from the customer server through a network a request datagram for collecting specified data includes a request for specified data from the multiple geographically remote data collecting field units in the multiple geographically proximate, data-collecting field units.

24. A system for transporting datapackets or datagrams to and from a customer server and a first geographically remote, data-collecting field unit that lies within a remote geographic region with multiple geographically proximate, data-collecting field units characterized by:

an IP host, geographically remote from the customer server, communicatively coupled to the customer server, and configured to:

receive from the customer server through a network a request datagram for specified data from the first geographically remote, data collecting, field unit;

add to the request datagram a first defined hopping path that includes the first geographically remote data collecting field unit and at least one of the other multiple geographically proximate, data-collecting field units to generate a data request packet; and send the data request packet to the first geographically remote data collecting field unit along the first defined hopping path.

25. The system for transporting datapackets or datagrams between a customer server and a first geographically remote, data-collecting field unit according to claim 24 wherein the first geographically remote data collecting field unit is configured to deliver the datagram as received by the IP Host from the customer server to a customer monitor.

26. The system for transporting datapackets or datagrams between a customer server and a first geographically remote, data-collecting field unit according to claim 25 wherein the first geographically remote data collecting field unit is configured to receive from the customer monitor a response datagram that includes the specified data at the first geographically remote data collecting field, to add to the gathered specified data a second defined hopping path that includes the IP Host and at least one of the other multiple geographically proximate, data-collecting field units to generate a data response packet, and to transmit the response datagram with the collected data to the IP Host along the second defined hopping path.

27. The system for transporting datapackets or datagrams between a customer server and a first geographically remote, data-collecting field unit according to claim 26 wherein the IP Host is configured to receive the data response datagram and transmit the response datagram with the gathered data to the customer server through a network.

28. The system for transporting datapackets or datagrams between a customer server and a first geographically remote, data-collecting field unit according to claim 27 wherein the geographically-spaced data-collecting field units include a customer monitor for collecting data at a particular location and a communication unit that is configured to receive and send wireless signals.

29. The system for transporting datapackets or datagrams between a customer server and a first geographically remote, data-collecting field unit according to claim 28 wherein the IP Host is geographically proximate to one or more of the geographically-spaced data-collecting field units.

30. The system for transporting datapackets or datagrams between a customer server and a first geographically remote, data-collecting field unit according to any one of claims 24-29 wherein the IP Host is programmed to read an identification of the first geographically remote data collecting field unit in the request datagram.

31. The system for transporting datapackets or datagrams between a customer server and a first geographically remote, data-collecting field unit according to claim 30 wherein the IP Host is configured with a table of defined hopping paths for each of the multiple geographically proximate, data-collecting field units and the IP Host is configured to select the first defined hopping path for the first geographically remote data collecting field unit from the table of defined hopping paths.

32. The system for transporting datapackets or datagrams between a customer server and a first geographically remote, data-collecting field unit according to any one of claims 24-31 wherein the IP Host is configured to add a header and footer with the first defined hopping path to the request datagram.

33. The system for transporting datapackets or datagrams between a customer server and a first geographically remote, data-collecting field unit according to any one of claims 24-33 wherein the first geographically remote data collecting field unit is programmed to select the last known good path between the first geographically remote data collecting field unit and the IP Host as the second defined hopping path for the data response packet.

34. The system for transporting datapackets or datagrams between a customer server and a first geographically remote, data-collecting field unit according to claim 24 wherein the network through which the request datagram and the response datagram is sent is the Internet.

35. The system for transporting datapackets or datagrams between a customer server and a first geographically remote, data-collecting field unit according to any one of claims 24-34 wherein the customer and the IP Host are at least outside the reach of RF communication.

36. The system for transporting datapackets or datagrams between a customer server and a first geographically remote, data-collecting field unit according to any one of claims 24-35 wherein each of the multiple geographically proximate, data-collecting field units are within the range of 1 to 10 miles of at least one other of the multiple geographically proximate, data-collecting field units.

37. The system for transporting datapackets or datagrams between a customer server and a first geographically remote, data-collecting field unit according to any one of claims 24-36 wherein each of the multiple geographically proximate, data-collecting field units is within RF range of at least one other of the multiple geographically proximate, data-collecting field units.

38. The system for transporting datapackets or datagrams between a customer server and a first geographically remote, data-collecting field unit according to any one of claims 24-37 wherein the IP Host and each of the multiple geographically proximate, data-collecting field units are configured to transmit the data request packet and any response datagram through an RF network.

39. The system for transporting datapackets or datagrams between a customer server and a first geographically remote, data-collecting field unit according to claim 38 wherein the RF network is 900 MHz frequency radio waves.

40. The system for collecting transporting datapackets or datagrams between a customer server and a first geographically remote, data-collecting field unit according to any one of claims 37-39 wherein the geographic spacing of the multiple geographically proximate, data-collecting field units is less than 5 miles apart.

41. The system for collecting transporting datapackets or datagrams between a customer server and a first geographically remote, data-collecting field unit to any one of claims 24-40 wherein the remote geographic region with multiple geographically proximate, data-collecting field units is outside of wireless communication proximity from the customer server.

42. The system for transporting datapackets or datagrams between a customer server and a first geographically remote, data-collecting field unit according to any one of claims 24-41 wherein the IP Host is geographically within wireless communication proximity to one or more of the multiple geographically proximate, data-collecting field units.

43. A method for transporting datapackets or datagrams to a customer server from a first data-collecting or recording field unit, which lies within a geographic region with multiple geographically proximate, communication units and remote from the customer server, the method comprising:
    generating a data packet from current data from the first remote data-collecting or recording field unit;
    adding to the data packet a defined hopping path that includes at least one geographically proximate communication unit and an IP Host;
    sending the data packet from the first remote data-collecting or recording field unit to the IP Host;
    removing the hopping path from the data packet, and
    sending the data packet to the customer server through a network.

44. The method for transporting datapackets or datagrams according to claim 43 wherein the generation of the data packet is responsive to an event at the monitor or from routine collection of data that is periodically sent to the customer server without a request from the customer server.

45. A system for transporting datapackets to a customer server from at least one geographically remote, data-collecting customer monitor that lies within a geographic region remote from the customer server comprises:
    multiple geographically proximate, communication units and an IP Host within the remote area;
    at least one of the communication units positioned geographically proximate to the at least one geographically remote, data collecting customer monitor;
    wherein the at least one communication unit is configured to receive current data from the at least one geographically remote, data collecting customer monitor and to generate a data packet along with a defined hopping path that includes at least one other geographically proximate communication unit and the IP Host;
    wherein the at least one communication unit is further configured to send the data packet along the hopping path to the IP Host; and
    wherein the IP Host is configured to remove the hopping path from the data packet and to send the data packet to the customer server through a network.

Reasonable variation and modification are possible within the forgoing description and drawings without departing from the spirit of the invention. While the invention has been specifically described in connection with certain specific embodiments thereof, it is to be understood that this is by way of illustration and not of limitation, and the scope of the appended claims should be construed as broadly as the prior art will permit.

What is claimed is:

1. A system for transporting datapackets or datagrams to and from a customer server and a first geographically remote data-collecting field unit that lies within a remote geographic region with multiple geographically proximate data-collecting field units characterized by:
    an IP host, geographically remote from the customer server, communicatively coupled to the customer server, and configured to:
    receive from the customer server through a network a request datagram for specified data from the first geographically remote data collecting field unit;
    add to the request data ram a first predefined hopping path that includes the first geographically remote data collecting field unit and at least one of the other multiple geographically proximate data-collecting field units to generate a data request packet;

send the data request packet to the first geographically remote data collecting field unit along the first predefined hopping path; and deliver a datagram as received by the IP Host from the customer server to a customer monitor;

wherein the first geographically remote data collecting field unit is configured to receive from the customer monitor a response datagram that includes the specified data at the first geographically remote data collecting field unit, to add to the specified data a second predefined hopping path that includes the IP Host and at least one of the other multiple geographically proximate, data-collecting, field units to generate a data response packet, and to transmit the response datagram with the collected data to the IP Host along the second predefined hopping path.

2. The system for transporting datapackets or datagrams between a customer server and a first geographically remote data-collecting field unit according to claim 1 wherein the IP Host is configured to receive the data response packet and transmit the response datagram with the specified data to the customer server through a network.

3. The system for transporting datapackets or datagrams between a customer server and a first geographically remote data-collecting field unit according to claim 2 wherein the data-collecting field units include a customer monitor for collecting data at a particular location and a communication unit that is configured to receive and send wireless signals.

4. The system for transporting datapackets or datagrams between a customer server and a first geographically remote data-collecting field unit according to claim 3 wherein the IP Host is geographically proximate to one or more of the data-collecting field units.

5. The system for transporting datapackets or datagrams between a customer server and a first geographically remote data-collecting field unit according to claim 1 wherein the IP Host is programmed to read an identification of the first geographically remote data collecting field unit in the request datagram.

6. The system for transporting datapackets or datagrams between a customer server and a first geographically remote data-collecting field unit according to claim 5 wherein the IP Host is configured with a table of predefined hopping paths for each of the multiple geographically proximate data-collecting field units and the IP Host is configured to select the first predefined hopping path for the first geographically remote data collecting field unit from the table of predefined hopping paths.

7. The system for transporting datapackets or datagrams between a customer server and a first geographically remote data-collecting field unit according to claim 1 wherein the IP Host is configured to add a header and footer with the first predefined hopping path to the request datagram.

8. The system for transporting datapackets or datagrams between a customer server and a first geographically remote data-collecting field unit according to claim 1 wherein the first geographically remote data collecting field unit is programmed to select the last known good path between the first geographically remote data collecting field unit and the IP Host as the second predefined hopping path for the data response packet.

9. The system for transporting datapackets or datagrams between a customer server and a first geographically remote data-collecting field unit according to claim 1 wherein the network through which the request datagram and the response datagram is sent is the Internet.

10. The system for transporting datapackets or datagrams between a customer server and a first geographically remote data-collecting field unit according to claim 1 wherein the customer and the IP Host are at least outside the reach of RF communication.

11. A method for transporting datapackets or datagrams between a customer server and a first remote data-collecting field unit that lies within a remote geographic region with multiple geographically proximate data-collecting field units comprises:

sending from the customer server, through a network, a request datagram for specified data from the first remote data collecting field unit to an IP Host;

adding to the request datagram, at the IP Host, a first predefined hopping path that includes the first geographically remote data collecting field unit and at least one of the other multiple geographically proximate data-collecting field units to generate a data request packet;

sending the data request packet to the first geographically remote data collecting field unit along the first predefined hopping path to the first remote data collecting field unit;

delivering a datagram as received by the IP Host from the customer server to customer monitor;

receiving from the customer monitor a response datagram that includes gathered specified data at the first geographically remote data collecting field unit, to add to the gathered specified data a second predefined hopping path that includes the IP Host and at least one of the other multiple geographically proximate, and transmitting a response datagram back to the IP Host along a second defined hopping path that includes the IP Host and at least one of the other multiple geographically proximate data-collecting field units.

12. The method for transporting datapackets or datagrams between a customer server and a remote field unit according to claim 11 and further comprising transmitting the response datagram from the IP Host to the customer server through a network.

13. The method for transporting datapackets or datagrams between a customer server and a remote field unit according to claim 11 wherein the IP Host is geographically remote from the customer.

14. The method for transporting datapackets or datagrams between a customer server and a remote field unit according to claim 11 wherein the IP Host is geographically proximate to one or more of the data-collecting field units.

15. The method for transporting datapackets or datagrams between a customer server and a remote field unit according to claim 11 wherein the request datagram includes identification of the first geographically remote data collecting field unit, and the IP Host reads the identification of the first geographically remote data collecting field unit in the request datagram as part of adding the first defined hopping path to the request datagram.

16. The method for transporting datapackets or datagrams between a customer server and a remote field unit according to claim 15 wherein the IP Host has a table of defined hopping paths for each of the multiple geographically proximate data-collecting field units and first defined hopping path for the first geographically remote data collecting field unit is selected from the table of defined hopping paths as part of adding the first defined hopping path to the request datagram.

17. The method for transporting datapackets or datagrams between a customer server and a remote field unit according to claim 11 wherein the IP Host adds a header and footer with the first defined hopping path to the request datagram.

18. The method for transporting datapackets or datagrams between a customer server and a remote field unit according to claim 17 wherein the act of delivering the datagram includes stripping the header and footer from the request datagram and delivering the request datagram to a customer monitor.

19. The method for transporting datapackets or datagrams to and from remote field unit according to claim 18 and further comprising receiving specified data from a customer monitor at the remote field unit and adding to the specified data the second or last known good hopping path.

20. The method for transporting datapackets or datagrams between a customer server and a remote field unit according to any claim 11 wherein the second defined hopping path for the response datagram is the last known good path between the first geographically remote data collecting field unit and the IP Host.

21. The method for transporting datapackets or datagrams between a customer server and a remote field unit according to claim 20 wherein the last known good path is the last path used to deliver the request packet in a reverse direction.

22. The method for transporting datapackets or datagrams between a customer server and a remote field unit according to claim 11 wherein the network through which the request datagram and the response datagram is sent is the Internet.

23. The method for transporting datapackets or datagrams between a customer server and a remote field unit according to claim 11 wherein the customer and the IP Host are at least outside the reach of RF communication.

24. The method for transporting datapackets or datagrams between a customer server and a remote field unit according to claim 11 wherein the each of the multiple geographically proximate data-collecting field units are geographically within a range of 1 to 10 miles of at least one other of the multiple geographically proximate data-collecting field units.

25. The method for transporting datapackets or datagrams between a customer server and a remote field unit according to claim 24 wherein the geographic spacing of the multiple geographically proximate data-collecting field units is less than 5 miles apart.

26. The method for transporting datapackets or datagrams between a customer server and a remote field unit according to claim 11 wherein each of the multiple geographically proximate data-collecting field units is within RF range of at least one other of the multiple geographically proximate data-collecting field units.

27. The method for collecting transporting datapackets or datagrams between a customer server and a remote field unit according to claim 11 wherein a transmitting act includes transmission of the response datagram through an RF network.

28. The method for transporting datapackets or datagrams between a customer server and a remote field unit according to claim 27 wherein the RF network is 900 MHz frequency radio waves.

29. The method for transporting datapackets or datagrams between a customer server and a remote field unit according to claim 11 wherein the remote geographic region with multiple geographically proximate data-collecting field units is outside of wireless communication proximity from the customer server.

30. The method for collecting transporting datapackets or datagrams between a customer server and a remote field unit according to claim 29 wherein the IP Host is geographically within wireless communication proximity to one or more of the multiple geographically proximate data-collecting field units.

31. The method for transporting datapackets or datagrams between a customer server and a remote field unit according to claim 30 wherein the wireless communication proximity is RF wireless communication.

32. The method for transporting datapackets or datagrams between a customer server and a remote field unit according to claim 11 wherein from the customer server through a network a request datagram for collecting specified data includes a request for specified data from the multiple geographically remote data collecting field units in the multiple geographically proximate data-collecting field units.

* * * * *